(12) United States Patent
Walczyk et al.

(10) Patent No.: US 7,159,783 B2
(45) Date of Patent: Jan. 9, 2007

(54) CUSTOMIZABLE OPTICAL READER

(75) Inventors: Joseph Walczyk, Syracuse, NY (US);
Dieter Fauth, Schorndorf (DE); David Holzhauer, Camillus, NY (US); Robert M. Hussey, Camillus, NY (US); Barry Keys, Batavia, NY (US); Joseph Livingston, Camillus, NY (US); Michael D. Robinson, Weedsport, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 11/203,667

(22) Filed: Aug. 12, 2005

(65) Prior Publication Data

US 2005/0284943 A1    Dec. 29, 2005

Related U.S. Application Data

(63) Continuation of application No. 10/402,885, filed on Mar. 28, 2003, now Pat. No. 6,959,865.

(60) Provisional application No. 60/368,375, filed on Mar. 28, 2002.

(51) Int. Cl.
*G06K 7/10*      (2006.01)

(52) U.S. Cl. ............ 235/472.01; 235/454; 235/462.15; 235/462.45; 235/472.01

(58) Field of Classification Search ........... 235/472.01, 235/462.45, 462.15, 472.02
See application file for complete search history.

(56) References Cited

U.S. PATENT DOCUMENTS

| | | | | |
|---|---|---|---|---|
| 5,965,863 A | * | 10/1999 | Parker et al. | 235/462.25 |
| 6,899,273 B1 | * | 5/2005 | Hussey et al. | 235/462.48 |
| 2004/0256464 A1 | * | 12/2004 | Longacre et al. | 235/462.45 |

* cited by examiner

*Primary Examiner*—Seung Ho Lee
(74) *Attorney, Agent, or Firm*—Wall Marjama & Bilinski LLP

(57) ABSTRACT

An optical reader, which is operable in a "host commands" mode and a "host routines" mode. In the "host commands" mode, the reader receives and executes a script routine module from a host. In the "host routines" mode, the reader receives a script routine Module identifier from the host, and the reader, in turn, executes a selected one of a plurality of reader-stored script routine modules based on the identifier.

20 Claims, 11 Drawing Sheets

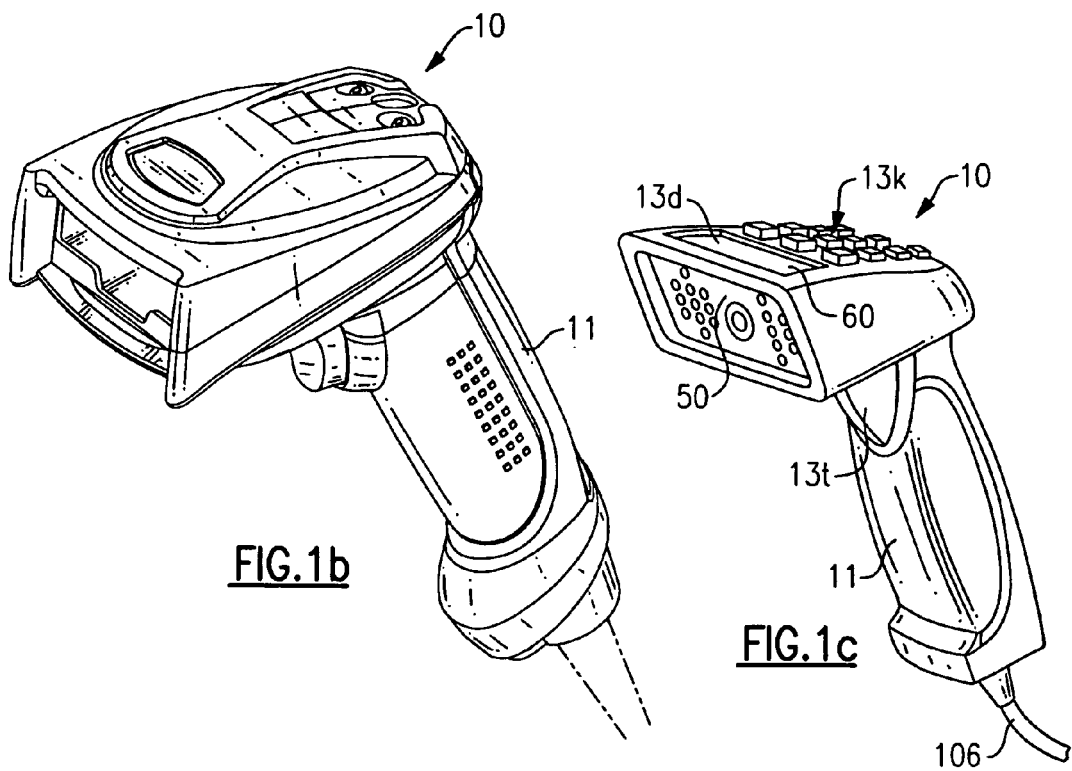
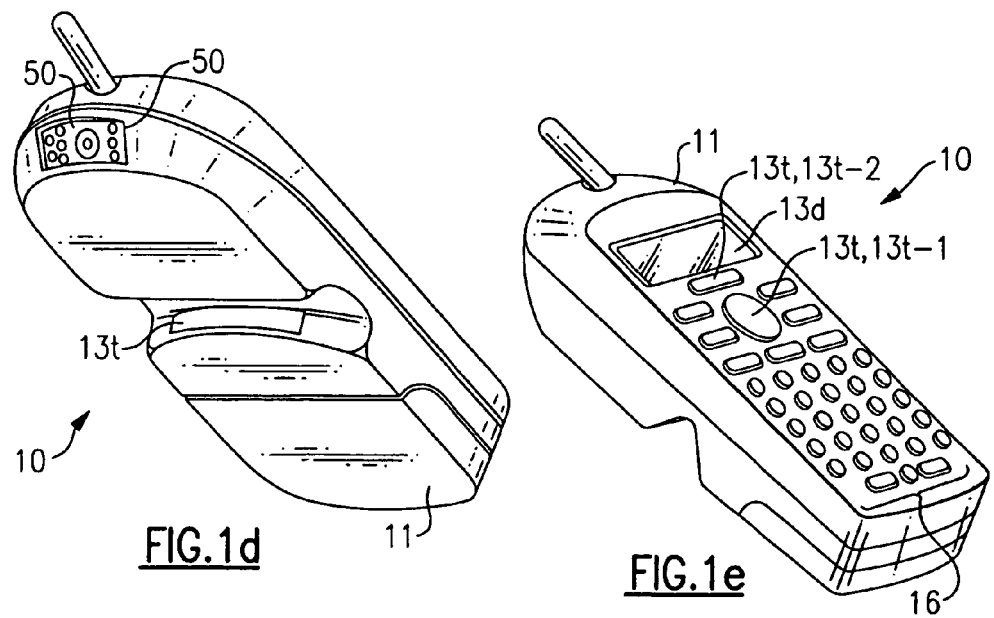

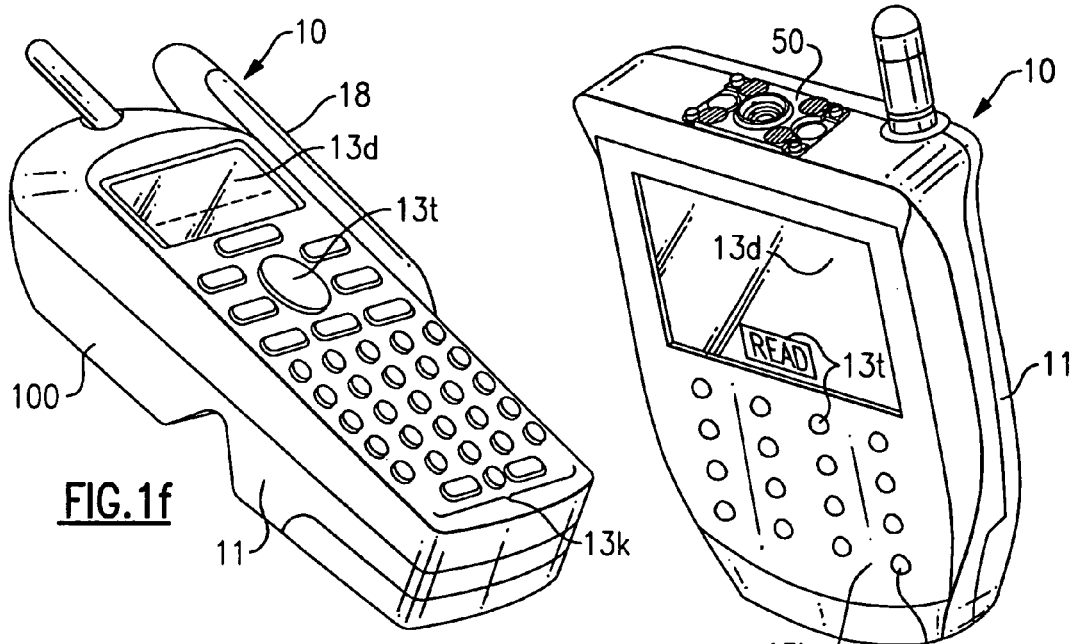
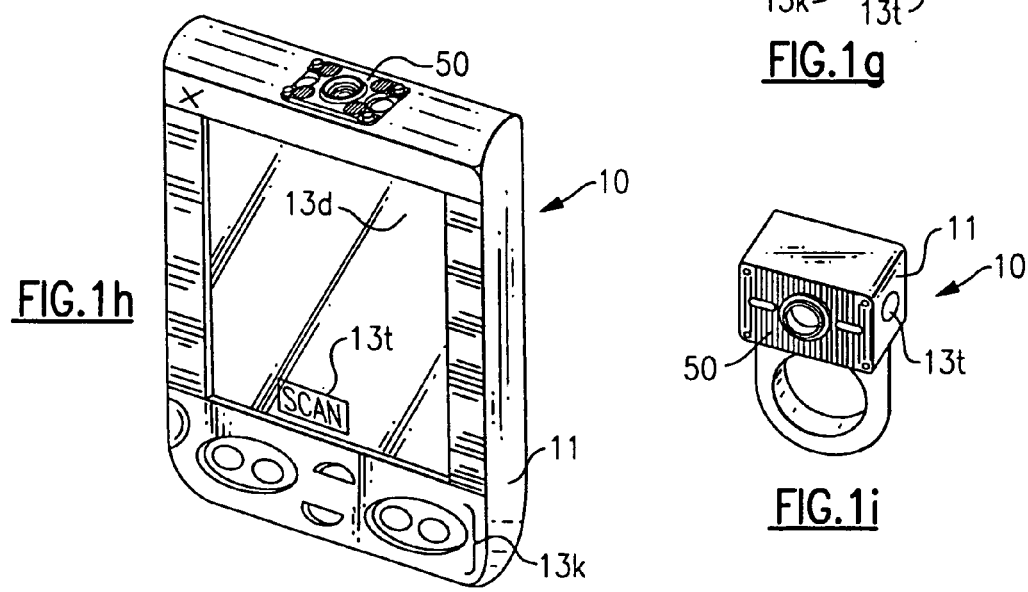
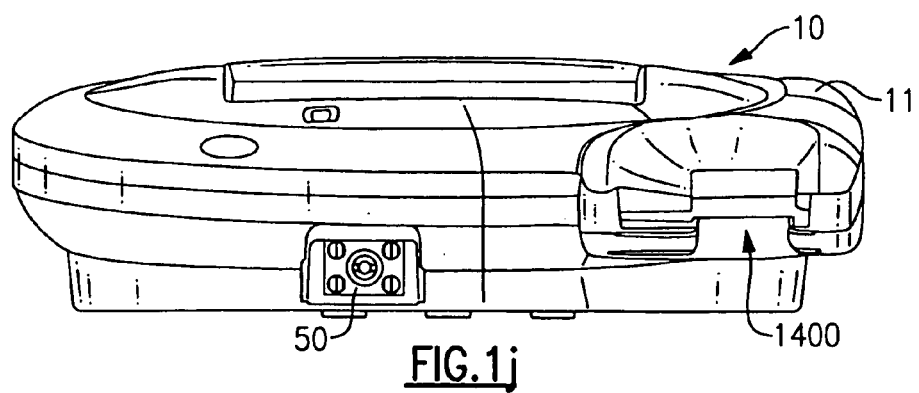

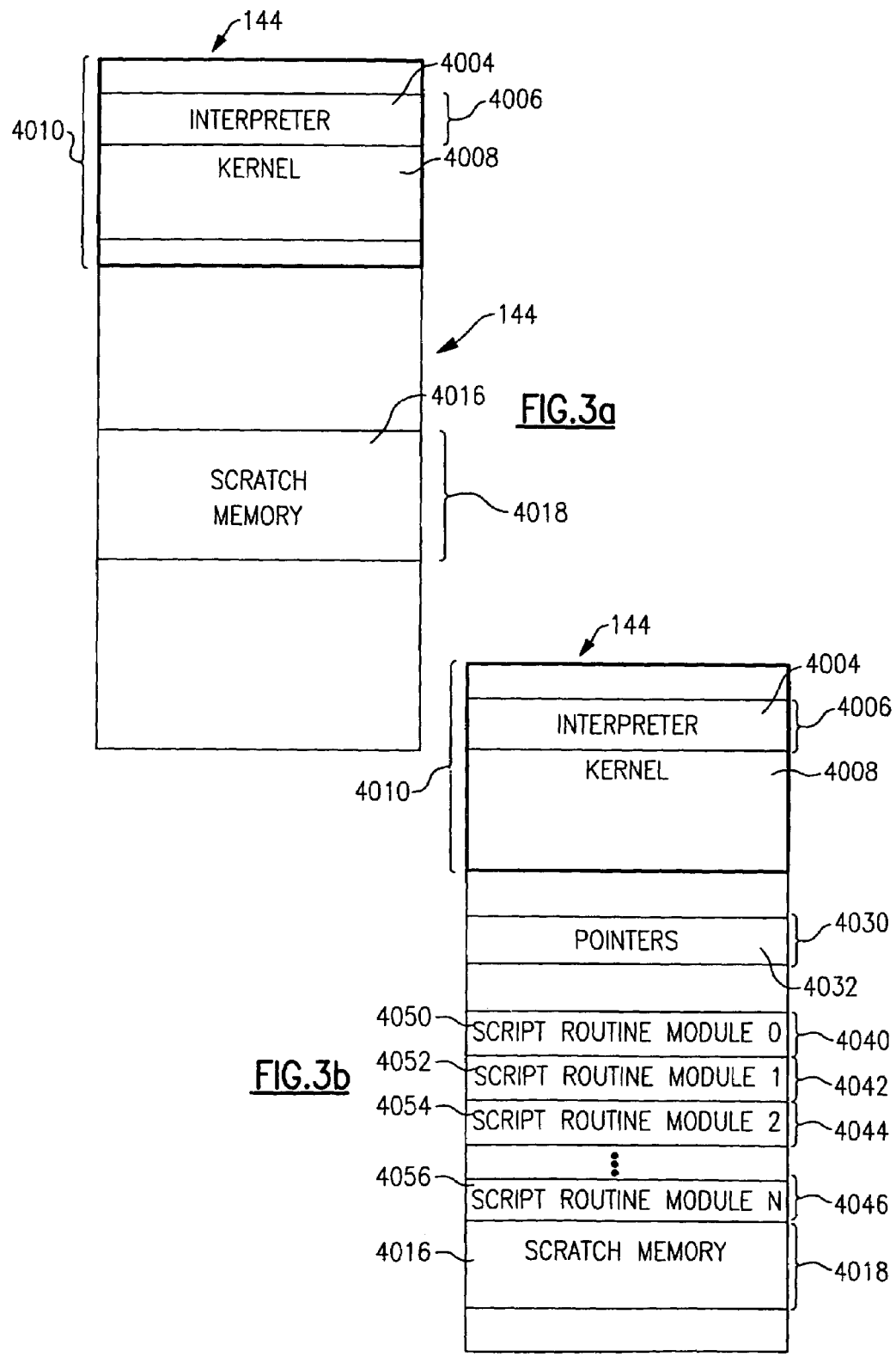

CUSTOMIZABLE OPTICAL READER

CROSS-REFERENCE TO RELATED APPLICATION

This application is a continuation of U.S. application Ser. No. 10/402,885, filed Mar. 28, 2003 now U.S. Pat. No. 6,959,856, entitled "Customizable Optical Reader" which claims the priority of provisional U.S. Application No. 60/368,375, filed Mar. 28, 2002, entitled, "Customizable Optical Reader Having Multiple User Selectable Instruction Execution Protocols." Priority to both of the above applications is claimed and both of the above applications are herein incorporated by reference in their entirety.

FIELD OF THE INVENTION

This invention relates generally to optical readers and specifically to system and methods for reprogramming optical readers.

BACKGROUND OF THE INVENTION

Optical readers tend to fall into one of three categories: wand readers, laser scan engine optical readers and image sensor based optical readers.

Wand readers generally comprise a single light source and single photodetector housed in a pen shaped housing. A user drags the wand reader across a decodable symbol (e.g., a bar code) and a signal is generated representative of the bar space pattern of the bar code.

Laser scan engine based optical readers comprise a laser diode assembly generating a laser light beam, a moving mirror for sweeping the laser light beam across a decodable symbol and a signal is generated corresponding to the decodable symbol.

Image sensor based optical readers comprise multi element image sensors such as CID, CMOS, or CCD image sensors and an imaging optic for focusing an image onto the image sensor. In operation of an image sensor based optical reader, an image of a decodable symbol is focused on an image sensor and a signal is generated corresponding to the signal. Image sensor elements may be arrayed in a line or in a rectangular matrix or area. Area image sensors capture a digital picture and use software algorithms to find and decode one or more symbols.

Users of laser scanner engine based optical readers have been switching in increasing numbers to image sensor based optical readers. Image sensor based optical readers are more durable and offer additional features relative to laser scan engine based bar code readers. Features and functions which have been incorporated into image sensor based optical readers involve image processing.

An image sensor based optical reader having image processing functionality is described in U.S. Pat. No. 6,298, 176, issued Oct. 2, 2001, entitled "Symbol-Controlled Image Data Reading System," assigned to the assignee of the present invention and incorporated by reference. In the patent, an optical reader is described which reads an image data reading instruction symbol and which outputs image data which may include signature data in manner that depends on the information encoded in the image reading instruction symbol.

The added functionality possible with optical readers, coupled with reduced costs, have made optical readers attractive to an ever-widening market of users who seek to employ optical readers in an ever-growing variety of applications. Manufacturers of optical readers have been tested in satisfying all of their customer demands for readers, which can satisfy a greater variety of optical reader applications. Accordingly, there is a need for an optical reader which can readily be custom programmed to operate in a manner consistent with a user's particular application.

SUMMARY OF THE INVENTION

According to its major aspects and broadly stated in the invention is a customizable optical reader, which may be programmed in a variety of ways.

In one aspect, the invention includes an optical reader including script interpreter enabling the reader to execute complex and varied commands and strings of commands (which may be referred to as "script routine modules") during execution of a main program.

In another aspect, the invention includes an optical reader, which is operable in a "host commands" mode and a "host routines" mode. In the "host commands" mode, the reader receives and executes a script routine module from a host. In the "host routines" mode the reader receives a script routine module identifier from the host, and the reader, in turn, executes a selected one of a plurality of reader-stored script routine modules based on the identifier.

These and other details, advantages and benefits of the present invention will become apparent from the detailed description of the preferred embodiment and the associated drawings.

BRIEF DESCRIPTION OF THE DRAWING

For a further understanding of these and objects of the invention, reference will be made to the following detailed description of the invention which is to be read in connection with the accompanying drawing, wherein:

FIGS. 1b–1j are prospective views of various readers according to the invention;

FIGS. 3a–3b are memory maps illustrating an implementation of the invention;

DETAILED DESCRIPTION OF THE INVENTION

Figure 1A:
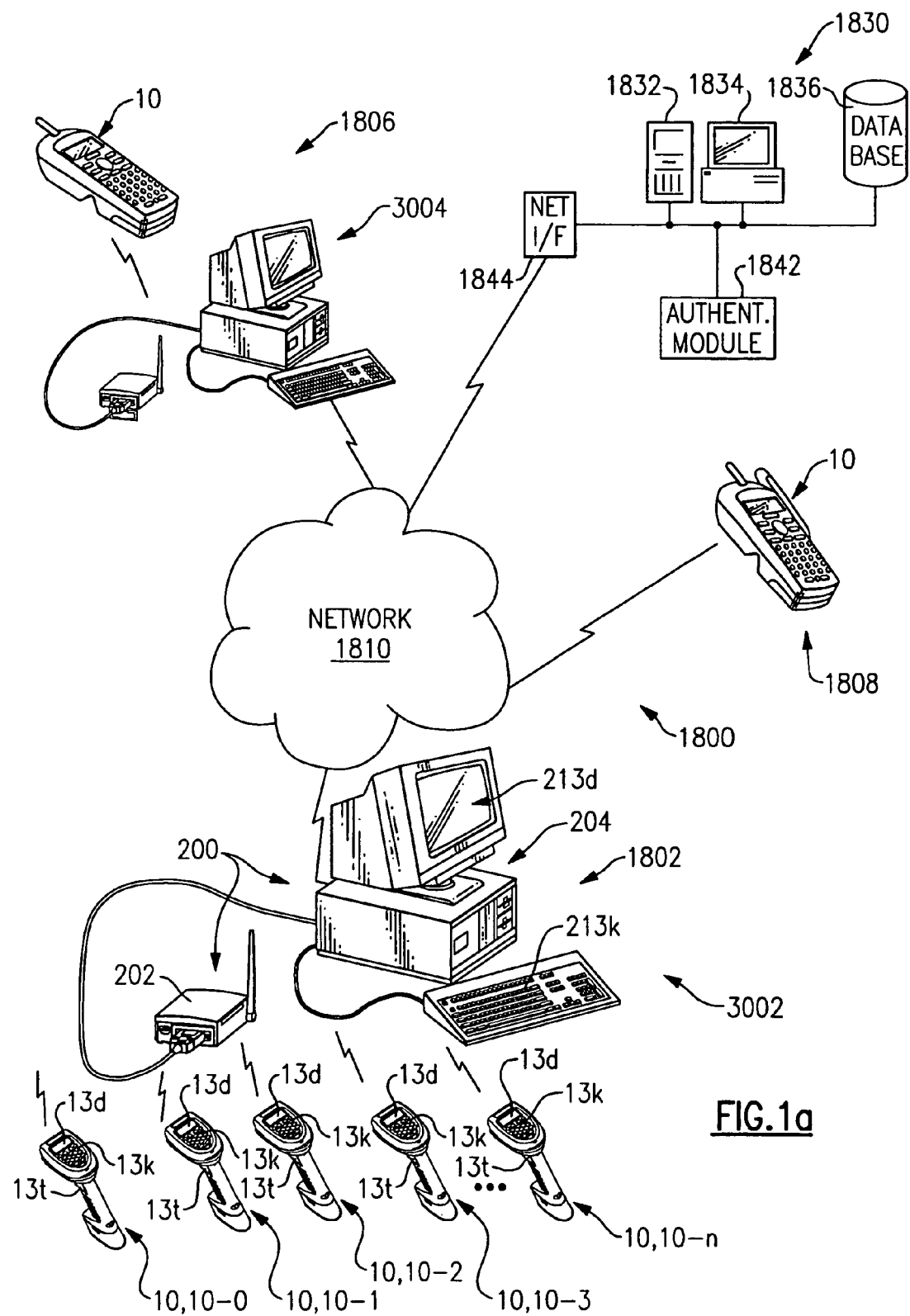
FIG. 1a is a schematic/physical view of an optical reader network.

An optical reader network 1800 is shown in physical form/schematic view of FIG. 1a. Network 1802 at multiple reader work location 3002 may be a local area network (LAN) including a plurality of optical readers 10-0, 10-1, 10-2, 10-3, 10-N. Each of the readers 10-0, 10-1, 10-2, 10-3, 10-N is in radio communication with base 202 of host 200, which, along with host computer 204 make up host 200. Host 200, in turn, is in communication with network 1810. Network 180 may be part of the Internet. However, network 1810 may also be a private network. Through network 1810 host 200 is in communication with customer service center network 1830 which is typically maintained by the supplier and/or manufacturer of readers 10. Customer service network 1830 may include (e.g., network interface device 1844, a server 1832, several personal computers of which computer 1834 is representative, a database 1836 and an authentication module 1842) which allows only registered users to access the contents of database 1836. Resident on server 1832 of customer service network 1830 is an internet website allowing users of reader 10 to access information about reader 10 including reader loadable programs and/or program instructions which may be loadable on to readers 10. Network 1830 may be a local area network (LAN) but often is provided by a wide-area network (WAN) having components spread out over various locations.

Also in communication with network 1810 (and with customer service network 1830 through network 1810) are readers at work locations other than work location 1804. At location 1806, a single reader 10 having a network interface incorporated therein is in communication with network 1810. At location 3004, a network 1806 is provided including a single reader 10 in communication with a host 400 in communication with network 1810. Each communication link of network 1800 may be wired or in the alternative, wireless.

From time to time it is useful to reprogram readers 10-0, 10-1 10-2, 10-3, 10-N. For example, if a manufacturer/supplier develops a new software function which may be executed by readers 10-0, 10-1, 10-2, 10-3, 10-N, it would be beneficial to load that software into readers 10-0, 10-1, 10-2, 10-3, 10-N. At location 3002, an application for readers 10-0, 10-1, 10-2, 10-3, 10-N may change. Readers 10-0, 10-1, 10-2, 10-3, 10-N may be required to operate to satisfy required functions of a first application and then, a second application. Readers 10-0, 10-1, 10-2, 10-3, 10-N or a subset of readers 10-0, 10-1, 10-2, 10-2, 10-3, 10-N may be required to satisfy required functions of e.g., a generic (i.e., any customer) inventory application, a generic shipping application, a generic receiving application, a generic point of sale application, a customer-specific shipping application, a customer-specific receiving application or a customer-specific point of sale application. For example, a customer may use readers 10-0, 10-1, 10-2, 10-3, 10-N 364 days a year in a point of sale operation, and one day a year in an inventory application.

An individual reader (e.g., reader 10-0) operates at its fastest speed if it does not have to communicate with any other device such as host 200 during execution of a main operating program resident thereon. Thus, a reader (e.g., reader 10-0) would operate at its fastest possible speed if an operating program, such as a compiled program with no script interpreter, were loaded thereon having all the program routines that were necessary for the operation of the reader in a particular application. However, the installation of a new operating program is often a painstaking, time-consuming process. The individual reader 10 has to be linked to a host 200, and an entire operating program has to be downloaded into reader 10, a process that can take at least several seconds, and up to several minutes, and is subject to failure. The reprogramming of each or several readers can be a logistical challenge given that readers are typically distributed at various locations throughout a work location, especially considering that a work location in accordance with the invention can comprise a wide geographic area (e.g., an entire continent or country). If the number of readers, N, is large, it can be seen that full-operating program reprogramming would result in extremely long delays and would perhaps not be worth the effort if a special programming function were needed only for a short duration of time, or for one isolated particular application.

Housings 11 for optical readers in which the invention can be employed are shown in FIGS. 1b–1j. In FIG. 1b, a gun style optical reader is shown as described in copending application Ser. No. 10/339,275, filed Jan. 9, 2003, entitled "Housing For Optical Reader," incorporated by reference. An imaging module (not shown) is incorporated in the reader housing 11. In FIG. 1c, a gun style reader 10 is shown having an integrated keyboard 13k and display 13d. In FIGS. 1d–1e, a portable data terminal (PDT) style reader is shown having a keyboard 13k and a display 13d. In FIG. 1g, an embodiment is shown wherein display 13d includes an associated touch screen overlay and which further includes a stylus 18 for entering signature information. In FIG. 1g, a cellular phone reader 10 is shown which has a display 13d and keyboard 13k and which incorporates an imaging module 50 as is described in U.S. patent application Ser. No. 10/092,789, filed Mar. 7, 2002, entitled, "Optical Reader Imaging Module," incorporated by reference. In the embodiment of FIG. 1h, a reader comprises a portable data assistant (PDA). In the embodiment of FIG. 1e, reader 10 includes housing 11 configured to be worn on a user's finger. In FIG. 1j, reader 10 is in the form factor of a transaction terminal, and includes a card reader 1400, as is more fully described in U.S. patent application Ser. No. 10/339,444, filed Jan. 9, 2003, entitled "Transaction Terminal Comprising Imaging Module." Numerous other form factors are possible. For example, in the previously incorporated U.S. patent application Ser. No. 10/092,789, filed Mar. 7, 2002, entitled, "Optical Reader Imaging Module," incorporated by reference, a pen style optical reader is shown. In U.S. patent application Ser. No. 09/432,282, filed on Nov. 2, 1999, entitled, "Indicia Sensor System For Optical Reader," incorporated by reference, a reader is shown which rests on a "scan stand."

For a better understanding of the invention, exemplary electrical hardware features of optical readers 10 are described with reference to FIGS. 2a and 2b.

Figure 2A:
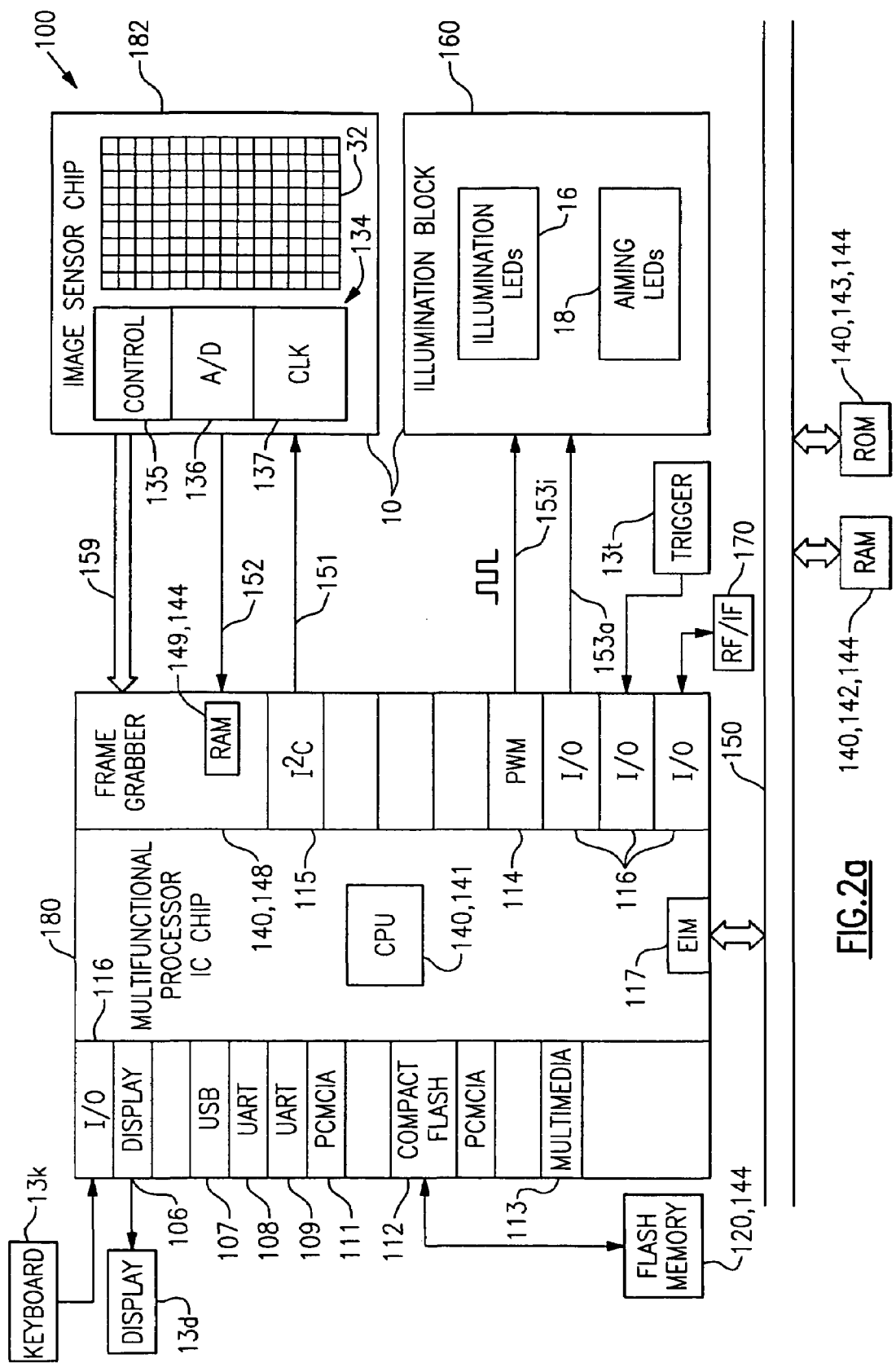
FIGS. 2a–2b are electrical block diagrams of readers according to the invention.

In FIG. 2a, a block diagram of an optical reader electrical circuit is shown having a multi-functional processor IC chip 180 including an integrated frame grabber block 148. Electrical circuit 100 shown in FIG. 2a can be utilized for control of a single 2D imaging module optical reader as is shown for example in U.S. Ser. No. 09/954,081 filed Sep. 17, 2001, entitled "Optical Reader Having Image Parsing Mode," which is hereby incorporated herein by reference in its entirety.

In the specific embodiment of FIG. 2a, electrical circuit 100 includes a control circuit 140 comprising CPU 141, system RAM 142 and system ROM 143 and frame grabber block 148. Electrical circuit 100 further includes an image sensor 32 typically provided by a photosensitive array and an illumination block 160 having illumination LEDs 16 and aiming LEDs 18 as shown in the physical form view of FIGS. 3a–3c. Image sensor 32 of FIG. 2a is shown as being provided by a 2D photo diode array. If a 1D image sensor replaces image sensor 32, then aiming LEDs 18 and illumination LEDs 16 may be constituted by one set of LEDs. In the embodiment shown, image sensor 32 incorporated in an image sensor IC chip 182 which typically further includes an image sensor electrical circuit block 134. Image sensor electrical block 134 includes control circuit 135 for controlling image sensor 32, an A/D conversion circuit 136, for converting analog signals received from image sensor 32 into digital form and integrated clock 137 sometimes referred to as an oscillator.

In the embodiment shown in FIG. 2a, CPU 141 and frame grabber block 148 are incorporated in a multi-functional IC chip 180, which in addition to including CPU 141 includes numerous other integrated hardware components. Namely, multi-functional IC chip 180 may include a display control block 106, several general purpose I/O ports 116, several interface blocks such as a USB circuit block 107 and a UART block 108 for facilitating RS 232 communications, a UART block 109 for facilitating infrared communications (including communication according to standards promulgated by the INFRARED DATA ASSOCIATION® (IrDA®), a trade association for defining infrared standards), and a pulse width modulation (PWM) output block 110. Multi-functional processor IC chip 180 can also have other interfaces such as a PCMCIA interface 111, a compact flash interface 112, and a multimedia interface 113. Electrical circuit 100 could also include an RF interface 170 in communication with I/O interface 116 providing communication with an external device such as host 200. If reader 5 includes a display 13d, display 13d may be in communication with chip 180 via display interface 106. Trigger 13t and keypad 13k may be in communication with chip 180 via general purpose I/O interface 116. Physical form views of readers having displays and keyboards are shown, for example, in U.S. application Ser. No. 10/137,484, filed May 2, 2002, entitled "Optical Reader Comprising Keyboard," which is hereby incorporated herein by reference in its entirety. Multi-functional processor IC chip 180 may be one of an available type of multifunctional IC processor chips which are presently available such as a Dragonball MX1 IC processor chip or a Dragonball MXL IC processor chip available from Motorola, a DSC IC chip of the type available from Texas Instruments, an O-Map IC chip of the type available from Texas Instruments, or a multifunctional IC processor chip of a variety known as Clarity SOCs (e.g., system on a chip) available from Sound Vision, Inc.

In one embodiment, multi-functional processor IC chip 180 comprises components that provide at least the functions provided by a CPU 140, system RAM 142 and system ROM 143. In some embodiments, it is advantageous that microprocessor-based decoder module 180 comprises an integrated circuit device having integrated therein a microprocessor, an analog-to-digital converter, a digital-to-analog converter, a direct memory access (DMA) channel, a bi-directional communication line for communication with a sensor such as either or both of line 151 and 152, and a channel for data receipt from a sensor, such as data line 159 that brings data to frame grabber 148. The microprocessor-based IC chip 180 can comprise semiconductor materials, optical materials, and photonic bandgap materials. In some embodiments, it is advantageous that the multi-functional processor IC Chip 180 further comprise I/O 116 suitable to accept user input (for example, from a keyboard 13k), interface capability for "flash" memory devices such as "Multimedia" (MMC), "Smart Media," "Compact Flash," and "Memory Stick." Other features that may be used to advantage include pulse width modulators (PWMs), serial communication channels (e.g., UARTs, SPIs, and USBs), display drivers and controllers such as for an LCD, wireless communication capability such as Bluetooth and 802.11(a), (b), and (g)-compatible transmitter/receivers, sequence control modules such as timer banks, sensor controllers, audio generators, audio coder/decoders ("codecs"), speech synthesizers, and speech recognition hardware and/or software.

Frame grabber block 148 of IC chip 180 replaces the function of a frame grabbing field programmable gate array (FPGA) as discussed in commonly assigned U.S. patent application Ser. No. 09/954,081, filed Sep. 17, 2001, entitled, "Imaging Device Having Indicia-Controlled Image Parsing Mode," and U.S. patent application Ser. No. 09/904,697, filed Jul. 13, 2001, entitled "An Optical Reader Having a Color Imager," both of which are hereby incorporated herein by reference in their entirety. More particularly, frame grabber block 148 is specifically adapted collection of hardware elements programmed to carry out, at video rates or higher, the process of receiving digitized image data from image sensor chip 182 and writing digitized image data to system RAM 142 which in the embodiment shown is provided on a discreet IC chip. Frame grabber block 148 includes hardware elements preconfigured to facilitate image frame capture. Frame grabber block 148 can be programmed by a user to capture images according to a user's system design requirements. Programming options for programming frame grabber block 148 include options enabling block 148 to be customized to facilitate frame capture that varies in accordance with image sensor characteristics such as image sensor resolution, clockout rating, and fabrication technology (e.g., CCD, CMOS, CID), dimension (1D or 2D), tonality (from 1 to N-bits), color (monochrome or color), biometric features, such as fingerprints, retinal patterns, facial features, and one-and two-dimensional patterns that can provide information, such as chromatography patterns and electrophoretic patterns of mixtures of substances, including substances such as biological samples comprising DNA. A decoder board that automatically adapts itself to satisfy the image capture requirements of a presently attached image sensor is described in U.S. patent application Ser. No. 10/339,439, filed Jan. 9, 2003, entitled, "Decoder Board For An Optical Reader Utilizing A Plurality Of Imaging Formats," incorporated by reference. Aspects of the operation of circuit 100 when circuit 100 captures image data into RAM 140 are now described. Circuit 100 can perform a cycle of receiving a frame of image data, performing internal programming functions, and decoding the frame of image data in a time period of less than or equal to a second. In a more preferred embodiment, the circuit 100 performs the cycle in a time period of less than or equal to 1/30 of a second. It is expected that in a still more preferred embodiment, the time period can be less than or equal to 1/270 of a second. When trigger 13t is pulled, CPU 141, under the operation of a program stored in system ROM 143, writes an image capture enable signal to image sensor chip 182 via communication line 151. Line 151, like the remainder of communication lines described herein represents one or more physical communication lines. In the embodiment shown, wherein image sensor chip 182 is of a type available from IC Media Corp., I²C interface 115 of chip 180 is utilized to facilitate communication with chip 182 (if another image sensor chip is selected another type of interface e.g. interface 116 may be utilized). Other types of signals may be sent over line 151 during the course of image capture. Line 151 may carry, for example, timing initialization, gain setting and exposure setting signals.

When control block 135 of image sensor chip 182 receives an image capture enable instruction, control block 135 sends various signals to frame grabber block 148. Image sensor control block 135 typically sends various types of synchronization signals to frame grabber block 148 during the course of capturing frames of image data. In particular, control block 135 may send to frame grabber block 148

"start of frame signals" which inform frame grabber block 148 that chip 182 is ready to transmit a new frame of image data, "data valid window" signals which indicate periods in which a row of image data is valid, and "data acquisition clock" signals as established by clock 137 controlling the timing of image data capture operations. In the embodiment described, line 152 represents three physical communication lines, each carrying one of the above types of signals. In an alternative embodiment, vertical and horizontal synchronization signals are processed by frame grabber 148 to internally generate a data valid window signal. Frame grabber block 148 appropriately responds to the respective synchronization signals, by establishing buffer memory locations within integrated RAM 149 of block 148 for temporary storage of the image data received from image sensor chip 182 over data line 159. At any time during the capture of a frame of image data into system RAM 142, buffer RAM 149 of frame grabber block 148 may store a partial (e.g., about 0.1 to 0.8) or a full line of image data.

Referring to further aspects of electrical circuit 100, circuit 100 includes a system bus 150. Bus 150 may be in communication with CPU 141 via a memory interface such as EIM interface 117 of IC chip 180. System RAM 142 and system ROM 143 are also connected to bus 150 and in communication with CPU 141 via bus 150. In the embodiment shown, RAM 142 and ROM 143 are provided by discreet IC chips. System RAM 142 and system ROM 143 could also be incorporated into processor chip 180.

In addition to having system RAM 142, sometimes referred to as "working" RAM, electrical circuit 100 may include one or more long-term storage devices. Electrical circuit 100 can include for example an "flash" memory device 120. Several standardized formats are available for such flash memory devices including: "Multimedia" (MMC), "Smart Media," "Compact Flash," and "Memory Stick." Flash memory devices are conveniently available in card structures which can be interfaced to CPU 141 via an appropriate "slot" electromechanical interface in communication with IC chip 180. Flash memory devices are particularly useful when reader 5 must archive numerous frames of image data. Electrical circuit 100 can also include other types of long term storage such as a hard drive which may be interfaced to bus 150 or to an appropriate I/O interface of processor IC chip 180.

In a further aspect of electrical circuit 100, control circuit 140 is configured to control the turning off and turning on of LEDs 16, 18 of illumination block 160. Control circuit 140 preferably controls illumination block 160 in a manner that is coordinated with the capturing of the frames of image data. Illumination LEDs 16 are typically on during at least a portion of frame capture periods. Configuring circuit 140 so that LEDs 16, 18 have off periods significantly reduces the power consumption of circuit 100.

In a further aspect of the electrical circuit 100, electrical circuit 100 can be configured so that PWM output interface 114 of IC chip 180 controls illumination LEDs of an imaging module such as illumination LEDs 16 of module 10-1 or aiming/illumination LEDs 18 of module 10-2.

In one embodiment, illumination block 160 is in communication with PWM output interface 114 and configured in such manner that LEDs 16 are turned on at a leading edge of PWM pulses output at PWM interface 114, and are turned off at falling edges of PWM pulses output at PWM interface 114. PWM interface 114 should be configured so that several pulses are generated and sent over communication line 153i during the time that a single row of pixels of image data are exposed to light prior to clocking out of pixel values corresponding to that row. Thus, illumination LEDs 16 would be turned on and off several times during the exposure period for exposing a row of pixels to light. Further, the number of pulses output by PWM output 114 during the time that a single row of pixels are exposed should not vary substantially from row to row. The pixel clock signal received at frame grabber block 148 of IC chip 180 can be utilized to generate the PWM output. It can be seen, therefore, that multifunctional IC chip 180 including frame grabber block 148 and PWM output 114 greatly simplifies the task of developing PWM signals for use in controlling illumination LEDs 16 of module 10.

In another embodiment, PWM output 114 and illumination block 160 are configured so that PWM output 114 controls the intensity of illumination, not the on time/off time of illumination. Illumination LED block 160 in such an embodiment can include a power supply circuit which is interfaced to PWM output 114 such that the PWM signal output at PWM output 114 varies the voltage or current supplied to LEDs 16.

In a further aspect of electrical circuit 100, aiming LEDs 18 of circuit 100 can be controlled by a signal transmitted by a general purpose I/O port 116 of IC chip 180 over communication line 153a. Multifunctional processor IC chip 180 can be programmed so that an aiming LED control signal is caused to change to an "ON" state when frame grabber block 148 completes the process of capturing a complete frame of image data. Frame grabber block 148 may be configured to generate an "end of acquisition" or "end of frame" signal when frame grabber block 148 completes the process of capturing a complete frame of image data into RAM 142. When CPU 141 receives an "end of acquisition" signal, CPU 141 controls I/O port 116 to change the state of an LED control signal. Control circuit 140 may also change the state of an LED control signal when generating a start of frame signal. Control circuit 140 may execute a delay prior to changing the state of an LED signal. Control circuit 140 is programmed so that an LED control signal remains in an "ON" state known to be sufficiently short duration so as not to cause actuation of an aiming LED 18 during a succeeding frame exposure period. Configured in the manner described, aiming LEDs 18 are selectively pulsed on for a short duration during intermediate successive frame exposure periods, e.g. frame exposure periods.

Figure 2B:
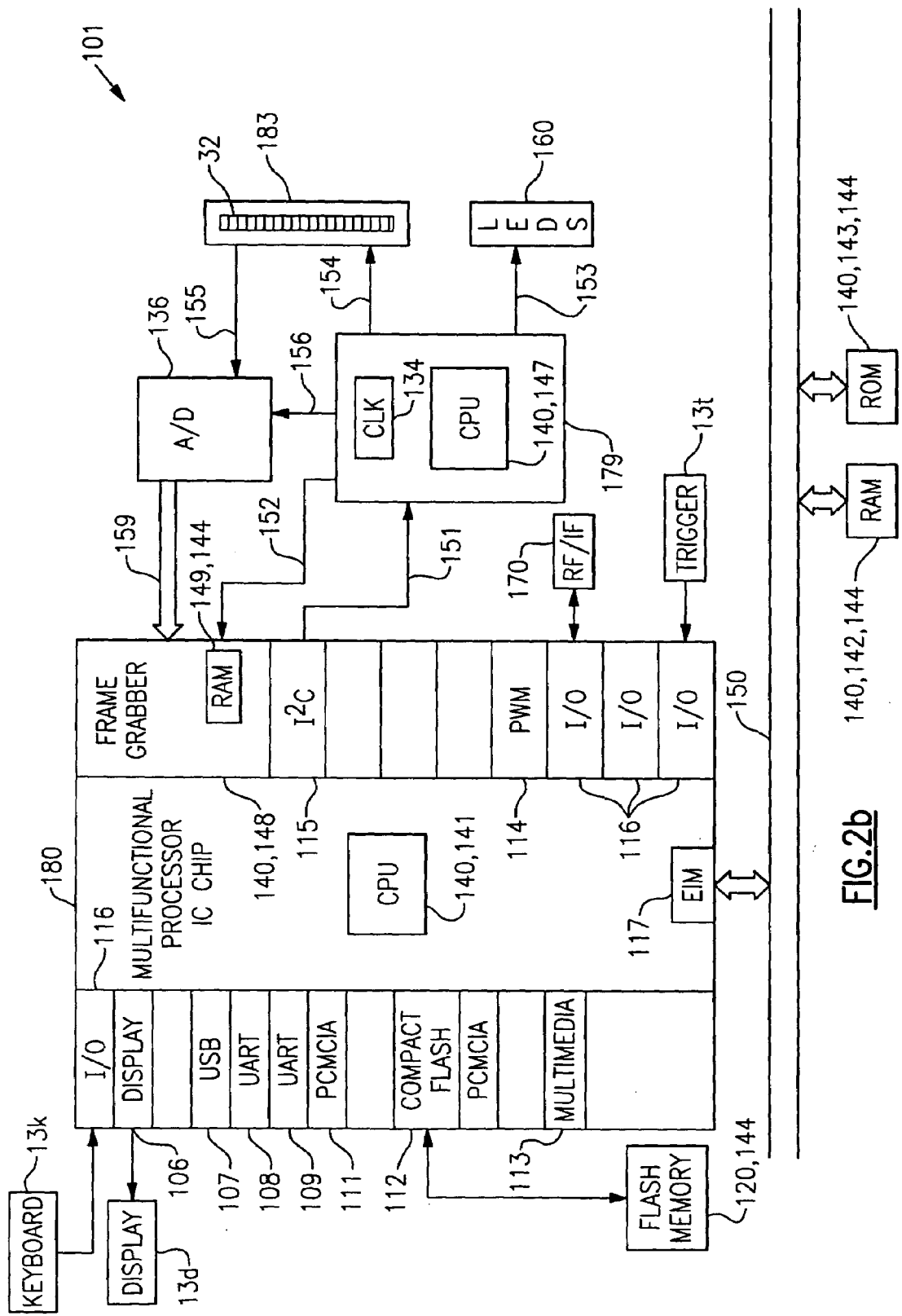

Referring now to FIG. 2b, electrical circuit 101 is described. Electrical circuit 101 controls operation of a single imaging module optical reader comprising a low cost 1D CCD image sensor 32 incorporated on IC chip 183. Image sensor 32 of FIG. 2b may be provided for example by a Toshiba Model TCD 1304 AP linear image sensor. Further aspects of an exemplary ID imaging module are described, for example, in application Ser. No. 09/658,811, filed Sep. 11, 2000, entitled "Optical Assembly for Barcode Scanner," which is hereby incorporated herein by reference in its entirety.

Referring to aspects of electrical circuit 101 in detail, electrical circuit 101 includes a control circuit 140 which, like control circuit 140 of circuit 100 is partially incorporated in a multifunctional processor IC chip 180 including CPU 141 and a frame grabber block 148. Control circuit 140 of circuit 101 further includes system RAM 142 system ROM 143 and supplementary central processor unit (CPU) 147, integrated on processor IC chip 179. System RAM 142 and system RAM 143 are in communication with EIM interface 117 of IC chip 180 via bus 150.

Processor IC chip 179 provides control and timing operations similar to that provided by electrical block 134 of image sensor chip 182 described in FIG. 1a. Processor IC chip 179, in general, sends synchronization signals and digital clocking signals to IC chip 180, and sends digital clocking signals to A/D conversion circuit 136 and image sensor 32. Processor IC chip 179 of circuit 101 may be a relatively low power processor IC chip such as an 8-bit Cypress Programmable System-on-Chip™ (PSOC™) CY8C26Z33-24PZI Microcontroller processor IC chip available from Cypress MicroSystems of Bothell, Wash. Aspects of the operation of IC chip 179 in during the course of capturing slice image data will now be described in detail. When trigger 13t is pulled, CPU 141 transmits enable image capture instructions over communication line 151. However, a user defined script instruction or module (a set of script instructions) when executed by reader 10, may override such a normal functioning of trigger 13t as a capture enable actuation. In response to receipt of an image capture enable instructions received from chip 180, processor IC chip 179 performs a variety of operations. Processor IC chip 179 may send synchronization signals, such as "start of scan," "data valid window," and "data acquisition clock" signals to frame grabber block 148 via communication line 152. Processor IC chip 179 may also send timing signals and digital clocking signals (e.g. master clock, integration clear gate, and shift gate pulse) to image sensor 32. Processor IC chip 179 typically also transmits a master clock signal to A/D conversion circuit 136. Referring to further aspects of IC chip 180 of circuit 101, CPU 141 of chip 180, may also send e.g. gain setting, exposure setting, and timing initialization signals via line 151 to IC chip 179. Communication between IC chip 180 and IC chip 179 may be made via an SPI interface or I/O interface 116 of chip 180 and chip 179.

As will be explained with reference to circuit 104, shown in FIG. 2e, processor IC chip 179 may be replaced by a programmable logic circuit, e.g. a PLD, CPLD, or an FPGA. IC chip 179 could also be replaced by an ASIC. Electrical circuit 101 of FIG. 2b, includes what may be termed a "digital digitizer" in that analog voltage levels transmitted by CCD image sensor 32 on line 155 are converted into gray scale pixel values by A/D converter 136 and transmitted via line 159 to frame grabber block 148. Circuit 101 could also include an analog digitizer which processes an analog signal generated by image sensor 32 to generate a two-state output signal that changes state in accordance with light-to-dark and dark-to-light transitions of the image sensor analog output signal.

Processor IC chip 179 also controls LED bank 160. LED bank 160 of a 1D image sensor reader typically includes a single bank of LEDs, which simultaneously illuminates a target area and provides an aiming pattern facilitating aligning of the reader with a target indicia.

Reader memory 144 of circuit 100 and of circuit 101 in the specific embodiments of FIGS. 2a and 2b includes system RAM 144, program ROM 143, on-board RAM 149, and flash memory 120.

In embodiments described, reader 10 includes an imaging assembly including an image sensor having a plurality of photosensors and an aiming/illumination system having LEDs 16, 18. In the alternative, an imaging assembly of reader 10 could be wand style (e.g., including a single photodetector and light source assembly which is manually moved across a target) or laser scan image engine based (e.g., including (a) a laser diode assembly generating a laser beam which is automatically swept across a target, and (b) a single photodetector). Referring now to particular aspects of the invention, a reader, according to the invention, includes a script/interpreter programming architecture. In a script/interpreter programming architecture, as is explained with reference to the memory map diagram of FIG. 3a, an interpreter 4004 is resident in address locations 4006 of memory 144 as part of a main operating program or "kernel". As will be explained in more detail herein, reader 10 may be programmed to wait for a script instruction or script routine module to be received from host 200. When the script instruction routine module is received from host 200, interpreter 4004 interprets the module and control circuit 140 executes the module. Control circuit 140 executes instruction of the script routine module without compiling the instruction of the script routine module together with the remaining instructions that make up of kernel 4008. During execution of the instructions that make up a script execution section, control circuit 144 executes a script routine module, a set of instructions that are not part of kernel 4008, which are interpreted by interpreter 4004, and which do not have to be compiled together with the remaining instructions that make up kernel 4008 prior to execution. Typically memory 144 further includes a scratch memory 4016 taking up address locations 4018. Scratch memory 4016 can serve a variety of useful purposes. For example, as a storage area for script routine modules received by reader 10 to be interpreted by interpreter 4004.

The establishing of a script/interpreter programming architecture greatly enhances the versatility of optical reader 10. Because control circuit 140 can execute script instructions, the functionality of reader 10 can be altered greatly without requiring that an entire new operating program be downloaded into reader 10. The functionality of reader 10 can be changed simply by making available to reader 10 a script routine module 5000 (FIG. 4) executable by control circuit 140 during execution kernel 4008. The script routine module executed by reader 10 may be changed depending on the present application requirements of reader 10. By allowing a customer to author and execute custom script instructions, the software architecture of FIGS. 3a and 3b frees the manufacturer/supplier who maintains network 1802, from having to rewrite the code operating on reader 10 each time a customer's application changes.

Referring to a further aspect of the invention, control circuit 140 is operable in a "host commands" mode and "host routines" mode. In the "host command mode", control circuit 140 executes a script routine module received from host 200 when executing the instructions of kernel 4008. In the "host routines" mode, control circuit 140 executes a script routine module resident in reader memory 144 when executing the instructions of kernel 4008. The reader is also operable in a "scanner resident" mode, which may also be termed a "reader resident" mode. In a scanner resident mode, control circuit 140 executes a main operating program which has been compiled and loaded onto reader 10. When executing a main operating program in a scanner resident mode, control circuit 140 does not receive any script instruction, script routine module, or script routine module identifier when executing instruction of the main operating program or kernel. The software architecture of the operating program of a reader 10 in the scanner resident mode may be of the script/interpreter type as described or else may be of another type (e.g., a fully compiled program without interpreter).

Figure 4A:
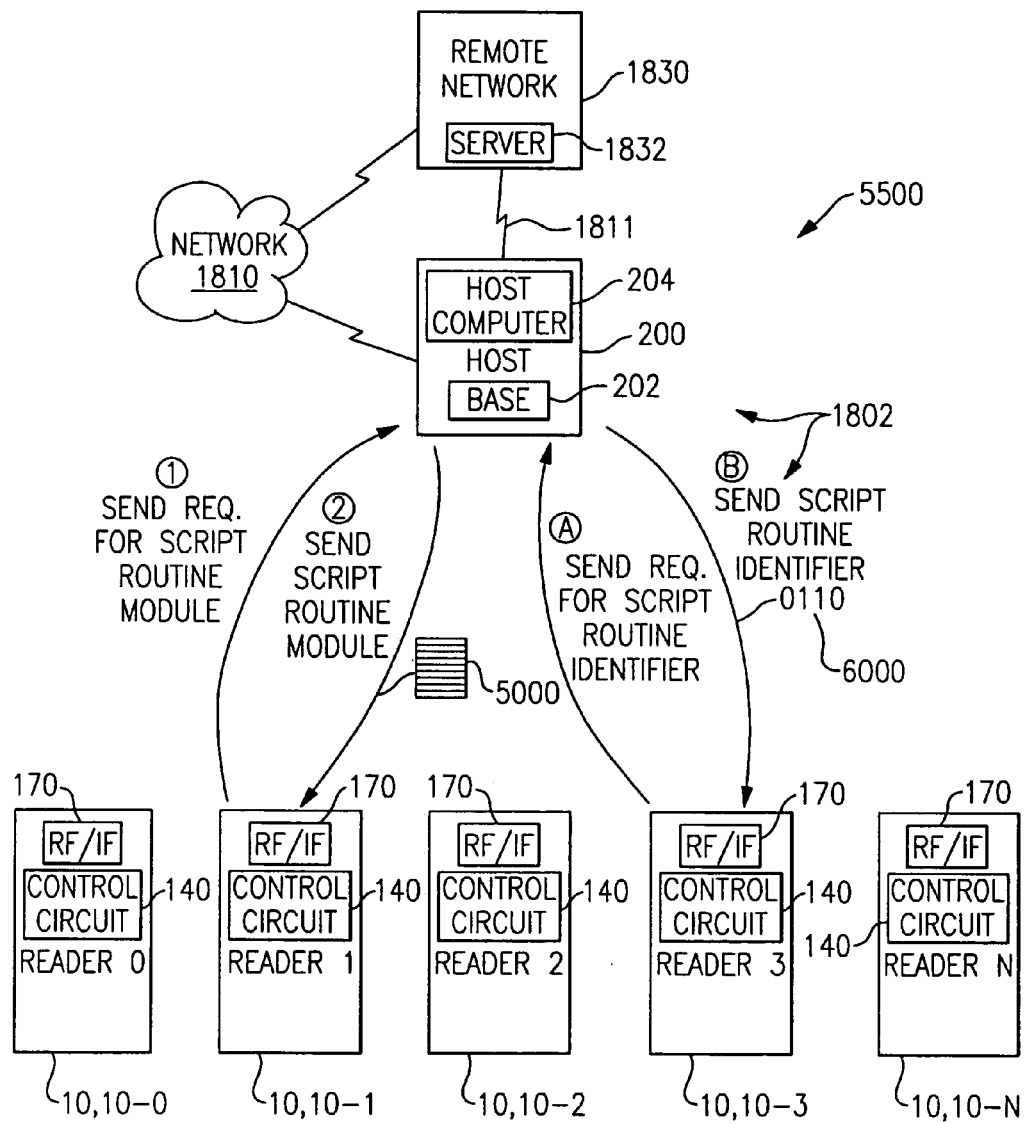
FIG. 4a is a schematic/flow diagram illustrating an implementation of the invention.
Figure 4B:
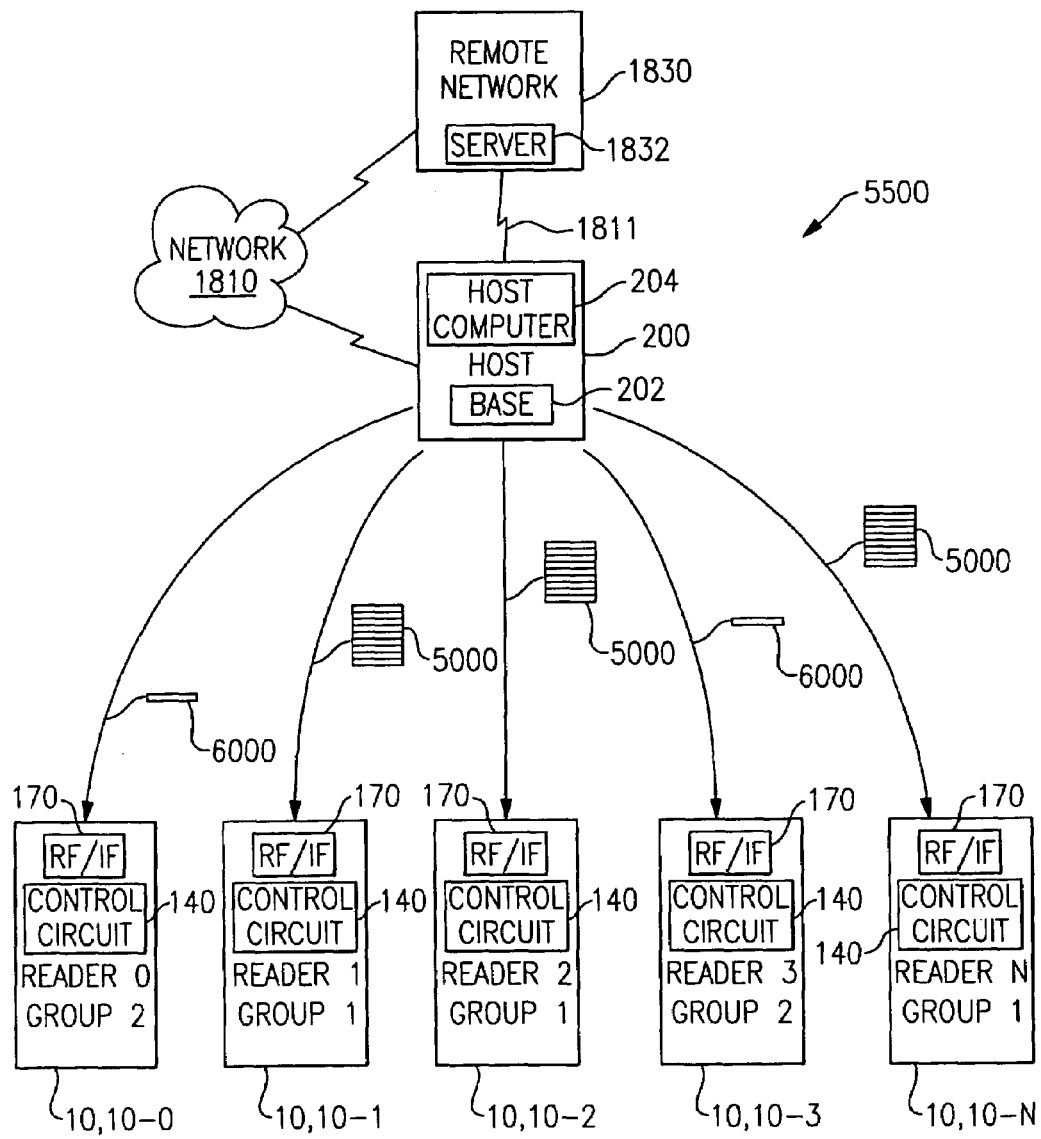
FIG. 4b is a schematic/flow diagram illustrating another implementation of the invention.

Steps executed by a reader operating in the respective "host commands" mode and in the "host routines" mode are described in greater detail with reference to the flow/block diagram 5500 of FIG. 4. Reader 10-1 of diagram 5500 is depicted as operating in a "host commands" mode while reader 10 of diagram 5500 is depicted as operating in a "host routines" mode.

At step 1 in a "host commands" mode, control circuit 140 sends a request to host 200 requesting that host 200 send to reader 10-1 a script routine module 5000. Host 200, in turn, at step 2, compiles a script routine module comprising a plurality of script instructions, and sends the script routine module 5000 to reader 10-1. Interpreter 4004 of reader 10-1 then interprets the script routine module and control circuit 140 executes the script routine module 5000. Alternatively, control circuit 140 in a "host command" mode may be programmed to wait for a script routine module to be received from host 200, rather than request that a host 200 send a script routine module, as indicated by step (1). In other words, step (1) can be deleted.

At step A in the "host routines" mode, control circuit 140 of reader 10-3 sends a request to host 200 requesting that host 200 send reader 10 a script routine module identifier 6000. Host 200, in turn, at step B, sends reader 10 an identifier 6000 identifying which of a plurality of script routine modules resident in memory 144 should execute. Reader 10-3, in turn, executes a script routine module corresponding to identifier 6000 sent by host 200. The word length of the identifier sent by host 200 in the "host routines" mode need only be a fraction (e.g., $\frac{1}{10}$th) of the word length of the script routine module sent by host 200 in the "host commands mode." Accordingly, it is seen that selection of the "host routines" mode reduces possible data collisions and speeds up operation of the reader 10-3 and/or network. Control circuit 140 in the "host routines" mode may be programmed to wait for script routine module identifier to be received from host 200.

A memory map of a reader operating according to a "host routines" mode in one embodiment is shown in FIG. 3b. At address locations 4010 memory 144 includes kernel 4008 having an interpreter 4004. At memory address locations 4030, memory 144 includes pointers 4032, and at memory locations 4040, 4042, 4044, 4046 memory 144 includes a plurality of discrete script routine modules 4050, 4052, 4054, 4046 each selectable by establishing of an appropriate program pointer. In the embodiment described with reference to FIG. 3b, control circuit 140, while operating in the "host routines" mode, establishes a pointer to install an appropriate one of script routine modules 4050, 4052, 4054, 4056 so that the selected script routine module 4050 corresponds with the identifier received from host 200. Prior to their loading in reader memory 144, modules 4050, 4052, 4054, 4056 may be authored by a user host computer 204. Host computer 204 may have programmed thereon a program builder toolkit for use in building modules 4050, 4052, 4054, 4056.

Figure 5A:
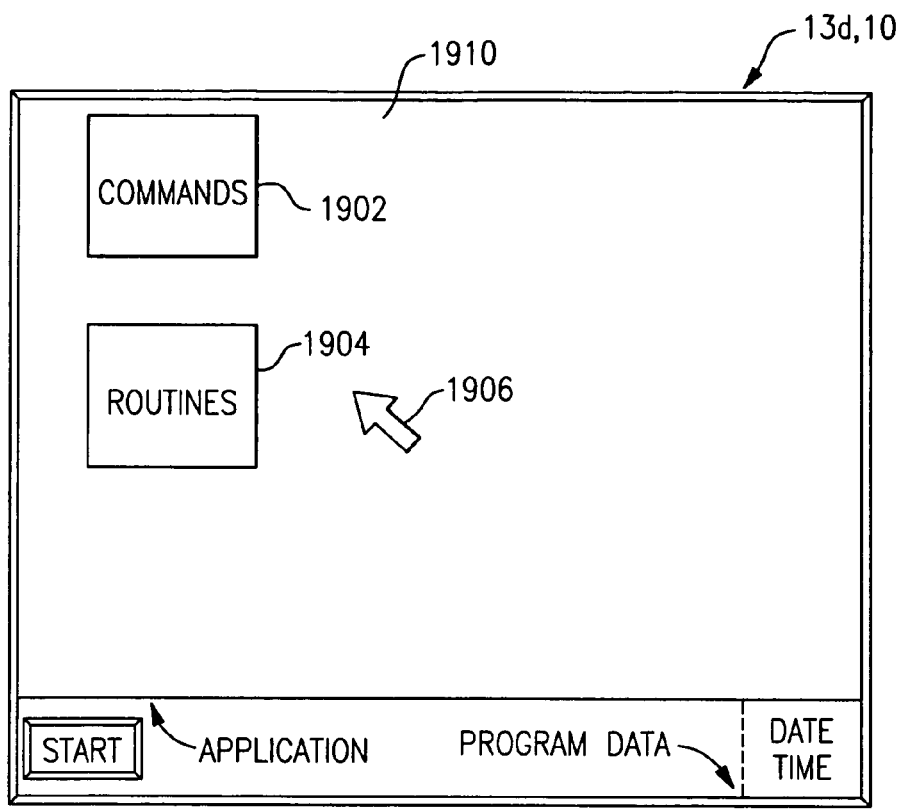
FIGS. 5a and 5b illustrate user interfaces which may be utilized in an implementation of the invention.
Figure 5B:
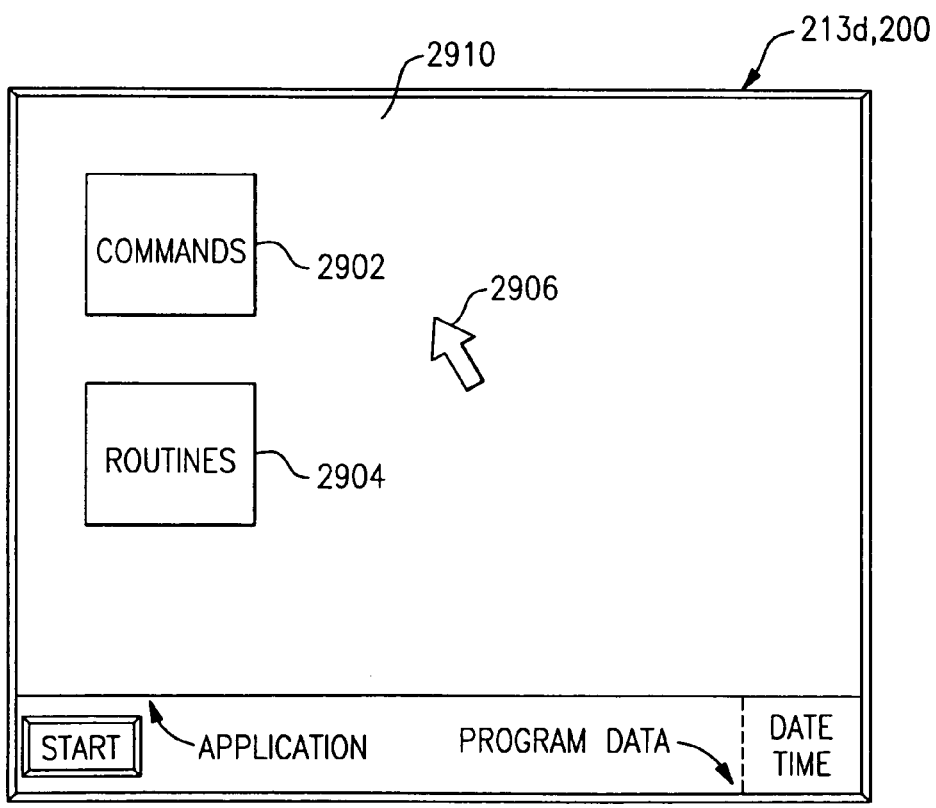

The modes of operation of reader 10 are selected by a user via a user interface 1910. The user interface can comprise displayed icons displayed on reader display 13d of reader 10 as depicted in FIG. 5a. Icons 1902, 1904 can be displayed as part of graphical user interface 1901 in which a pointer device (e.g., trackball, mouse) is used to move an arrow 1906 over a desired icon, and the actuated to effect selection of the mode corresponding to the icon. In a highly useful embodiment of the invention, the user interface utilized to select between the "host command mode" and the "host routines" mode is a user interface incorporated on host 200. Host 200 can include a user interface such as a graphical user interface 2910 as is indicated by FIG. 5b. Further, host 200 can be in communication with a plurality of readers (e.g., readers 10-0, 10-1, 10-2, 10-3, 10-N) and can be configured such that actuation of a user interface, (e.g., one of icon, e.g., icon 2902) results in each of the several readers 10-0, 10-1, 10-2, 10-3, 10-N being programmed in accordance with the same operating mode. Thus, actuation of "host commands" mode icon 240 results in each of readers 10-0, 10-1, 10-2, 10-3, 10-N being programmed to operate on a host commands mode. Likewise, actuation of "host routines" icon 2904 result in each of readers 10-0, 10-1, 10-2, 10-3, 10-N being reprogrammed in a "host routines" mode. Another type of user interface can be used. For example, network 1802 can be configured so that actuation of an appropriate keyboard 13k or 213k selects a mode of operation. Host 200 can also be programmed so that an actuation of a user initiated command or commands, results in readers of a particular "application group" which may be a subset of the N readers in a network, being programmed in the same way. Application groups are described in U.S. Pat. No. 6,161,760, filed Sep. 14, 1998, entitled "Multiple Application Multiterminal Data Collection Network". For example, host 200 may be utilized to program Application Group 1 to operate in a "host command" mode and Application Group 2 to operate in a "host routines" mode. If readers 10-1, 10-2, and 10-N have been programmed to be part of Application Group 1, and readers 10-0, 10-3 have been programmed to be part of Application Group 2, network 1802 will take on characteristics as illustrated with reference to FIG. 4b, wherein host 200 sends readers of Group 1 (readers 10-1, 10-2, 10-N) script routine modules 5000 (sets of script instructions) for execution by control circuit 140 of the reader, and wherein host 200 sends readers of Group 2 (readers 10-0, 10-3) identifiers 6000 for identifying at least one of a reader-resident script routine module is to be executed.

The benefits of the respective "host commands" and "host routines" modes of operation of reader 10 will be appreciated as will the benefits of having both of the modes available together.

The "host commands" mode is most useful where host control over operation of several readers 10 is at a premium. Suppose a specific script routine module 5000 must be executed by readers 10-0, 10-1, 10-2, 10-3, 10-N for only one hour of operation. The script routine module 5000 could be developed using computer 1834 at customer service network 1830 and made available at website of server 1832. A customer could then download the script routine module 5000 to host 200 via network 1810 or direct link 1811 (FIG. 4) and contemporaneously, each of several readers 10-0, 10-1, 10-2, 10-3, 10-N presently in communication with host could be programmed to operate in a "host commands" mode by actuation of icon 2902 or another suitable program method. Each of readers 10-0, 10-1, 10-2, 10-3, 10-N, when executing the instruction of kernel 4008, will execute the script routine module created at customer service network 1830. The "host commands" mode (a) provides for complete control by host 200 of reader operation and (b) eliminates the need to send compiled program codes to each of several readers, (e.g., readers 10-0, 10-1, 10-2, 10-3, 10-N). To change the operation of each of several readers 10-0, 10-1, 10-2, 10-3, 10-N, all that is needed is a change in a script routine module that is resident in host 200 and available for sending to each of several readers.

The "host routines" mode is most useful where speed is at a premium, and yet host control over operation of several readers 10-0, 10-1, 10-2, 10-3, 10-N is desired. When several readers operate in a "host routines" mode, host 200 maintains control over the operation of several readers, but only selects from preset script routine modules resident in the several readers (e.g., readers 10-0, 10-1, 10-2, 10-3, 10-N).

In a useful embodiment of the "host routines" mode, control circuit 140 can be configured to execute a string of script routine modules in succession. More specifically, memory 140 can include a plurality of script routine modules, 4050, 4052, 4054, 4056, and can be configured to execute two or more of the modules in succession in any selected order to define a function different than the function that is defined by control circuit 140 executing a single one of the modules. Accordingly, if a specific function was required of readers 10-0, 10-1, 10-2, 10-3, 10-N for only one hour of operation, personnel utilizing computer 1834 (such as engineers employed by the manufacturer of reader 10) at customer service center network 1830 could identify a string of subroutine modules within readers 10-0, 10-1, 10-2, 10-3, 10-N which, when executed together in succession, satisfied the required function. For example, modules 4050, 4052, 4056 executed in the order of (1) 4050; (2) 4056; (3) 4050, could define a new function. From the string of script routine modules, a corresponding string of identifiers could be created and transmitted from computer 1834 to host 200 via network 1810. A user of host 200 could reprogram all of readers 10-0, 10-1, 10-2, 10-3, 10-N in communication thereto in accordance with a "host routines" mode operation simply by actuation of routines icon 2904 as depicted in FIG. 5b. Operating in accordance with the host routines mode, all of readers 10-0, 10-1, 10-2, 10-3, 10-N would execute a string of script routine modules identified at customer service network 1830 as being capable of performing the required custom-made function.

The availability of both of the "host commands" mode and the "host routines" modes allows readers 10-0, 10-1, 10-2, 10-3, 10-N to be customized to the end that the needs of a customer can be satisfied. If a customer demands high accuracy, a highly specialized operating routine, and a host control of operation of one or more reader, the "host commands" mode can be selected. If a customer demands high-speed operation in a custom developed application, the "host routines" mode can be selected. If one of the modes of operation fails to satisfy the needs of a customer, the other mode of operation can be tried. For example, if during the course of operation in the "host routines" mode it is found that one or more of readers 10-0, 10-1, 10-2, 10-3, 10-N configured to operate in the mode had not previously been updated to include thereon all of the script routine modules 4050, 4052, 4054, 4056 specified by the script routine module identifier 6000 or identifier string sent by host 200 to reader 10, or if a required reader function cannot be satisfied by selection of one or more script routine modules resident on a reader, a user may select the "host commands" mode of operation so that all of the readers 10-0, 10-1, 10-2, 10-3, 10-N satisfy the required function.

An example of the invention is described with reference to the correspondence memory map of FIG. 6 in which various sections of pseudocode corresponding to an exemplary kernel and exemplary script routine modules are shown in association with the memory map originally described relative to FIG. 3b.

Figure 6:
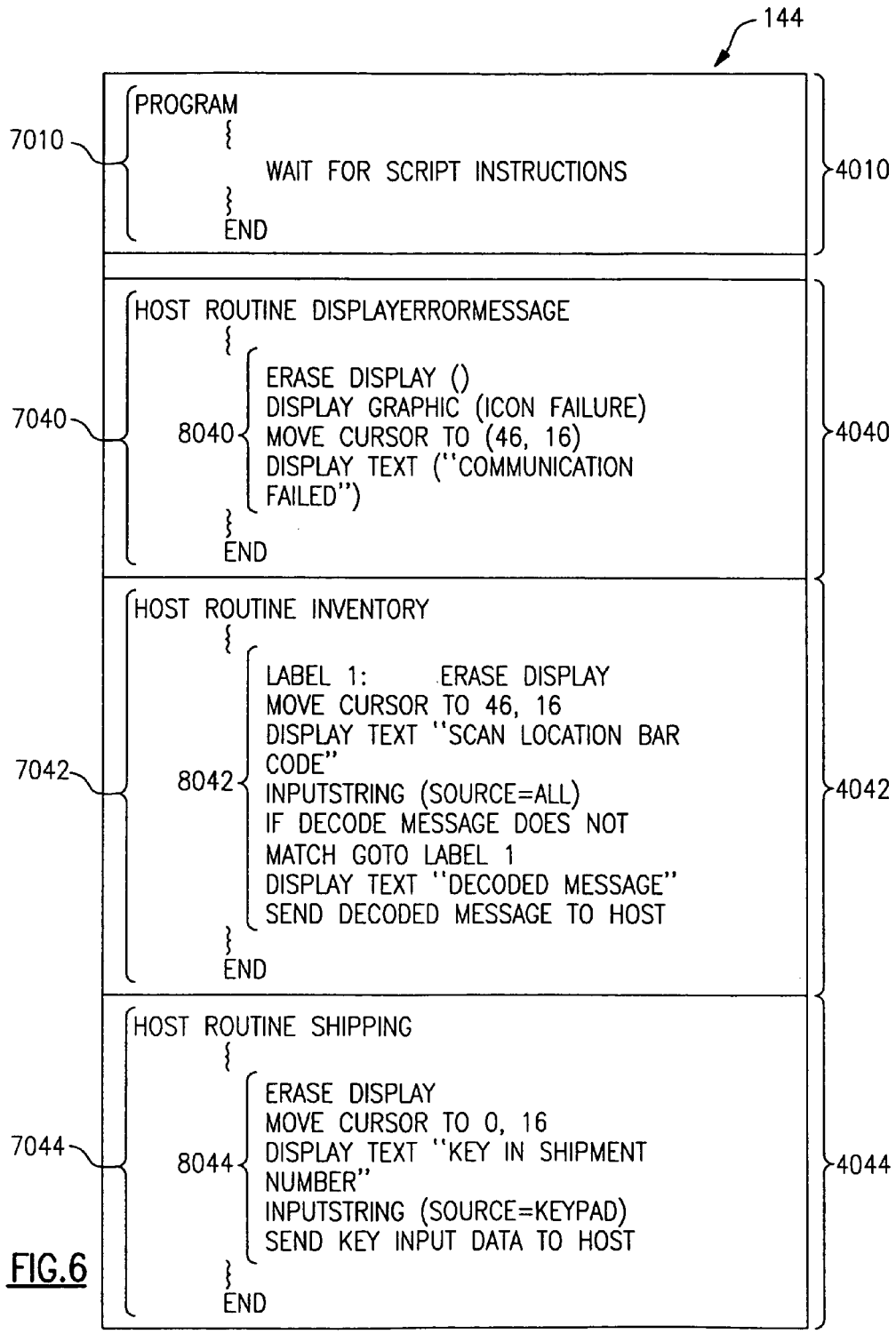
FIG. 6 is a memory map illustrating further aspects of the invention.

In the example of FIG. 6, a kernel utilizing address locations 4010 may simply wait for script instructions or a script routine module (a series of script instructions) as is indicated by one-line pseudocode program 7010.

Referring to further aspects of the memory map of FIG. 6, address locations 4040 may contain a script routine module for displaying a particular error message on display 13d as is indicated by pseudocode 7040. Further address locations 4042 may contain a script routine module for conducting an inventory application as is indicated by pseudocode 7042. Still further, address locations 4044 may contain a script routine module for conducting a shipping application as is indicated by pseudocode 7044.

In "host commands" mode, control circuit 140 of one or several like programmed readers interprets and executes a string of script instructions, (i.e., script routine modules 5000 received from host 200). For example, control circuit 140 of one or several like programmed readers, when operating in a "host commands" mode, may execute a string of instructions such as instructions corresponding to pseudocode 8040 or pseudocode 8042, or an entirely different script routine module customer authored by a user utilizing host 200 or reader 10. It is understood that when instructions corresponding to pseudocode 8040, pseudocode 8042, and pseudocode 8044 are executed by control circuit 140, various built in firmware functions of control circuit 140 are executed.

In addition to or as part of the GUI driver menu selector interface described relative to FIGS. 5a and 5b, reader 10 may be driven into "host routines" mode by the sending of a specialized script instruction from host 200 to reader 10. Specifically, identifier 5000 may comprise a script instruction including pointer information, which is interpreted and executed by control circuit 140 to select and execute a selected one of the script routine modules, which has been loaded into the memory locations 4040, 4042, 4044. An identifier 5000, for example, may comprise the compiled data corresponding to the pseudocode script instruction EXECUTE (INVENTORY). On receipt of the identifier, reader 10 executes the corresponding script routine module, which in the example of FIG. 6, corresponds to pseudocode 7042.

Figure 7:
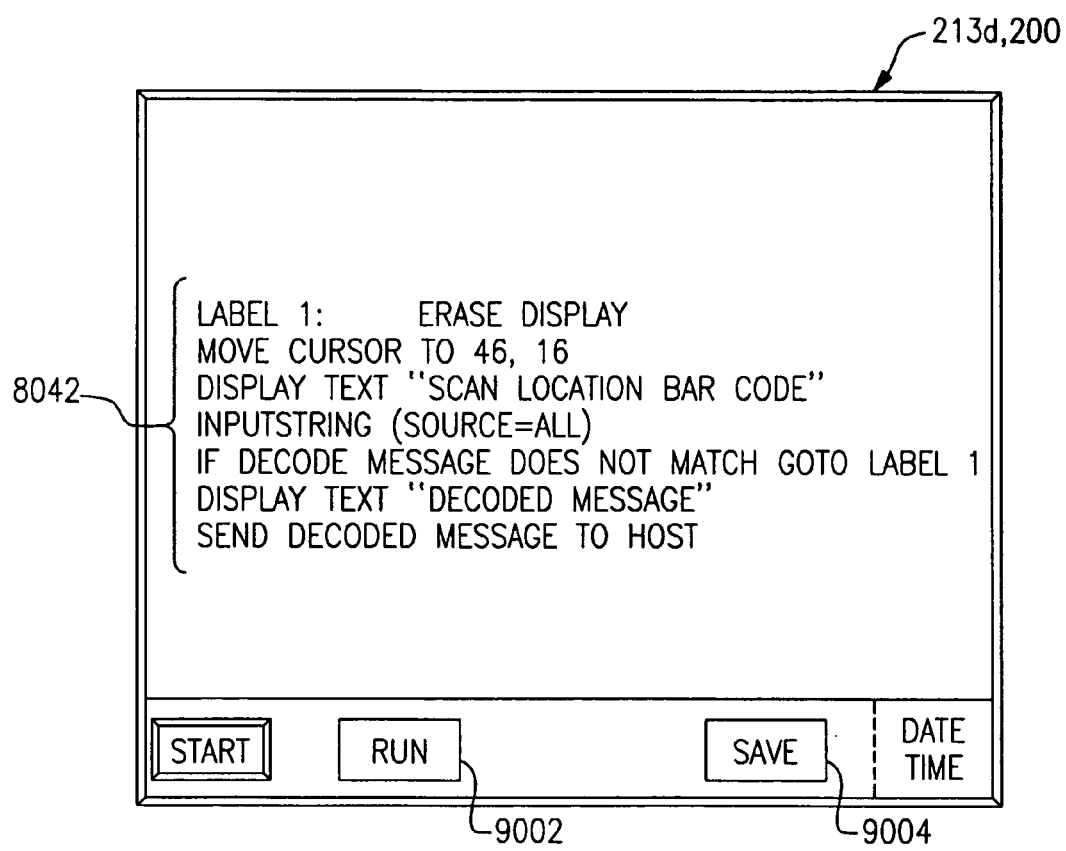
FIG. 7 is an exemplary user interface illustrating further aspects of the invention.

Referring to the user interface of FIG. 7, a user may build a script routine module utilizing an appropriate toolkit and GUI interface loaded onto host 200. When a user has authored a program in a user understandable language as in the pseudocode 8042 of FIG. 7, the user may select various control buttons. For example, actuation of RUN button 9002 may result in the authored program being compiled and formatted for sending to reader 10 or several readers 10 for interpretation and execution by reader 10 or several readers 10. Actuation of SAVE button 9004 may result in the authored program represented by pseudocode 9002 being compiled, formatted and loaded into a designated script routine module memory location of a reader 10 or readers 10 (e.g., location 4042) so that the program is executed by reader 10 when reader 10 operates in a "host routines" mode as described herein.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A method to create a custom function in an optical reader comprising the steps of:
   providing a hand held optical reader having a host routines mode and a plurality of script routine modules;
   providing a host computer to communicate with the optical reader;
   providing a computer to order script routine modules into lists that can be executed in succession by the optical reader;
   identifying a string of the script routine modules using the computer such that when said string of script routine modules are executed together in succession said string of script routine modules define a function;
   generating a string of identifiers representing the string of script routine modules on the computer;

transmitting the string of identifiers from the computer to the host computer;

transmitting the string of identifiers from the host computer to one or more optical readers set to the host routines mode; and executing the custom function on at least one of the optical readers as the execution order of a selected list of script routine modules.

2. The method of claim 1, to create a custom function wherein the step of identifying a string of the script routine modules comprises identifying a string of the script routine modules using the computer such that when the script routine modules are executed together in succession said string of script routine modules define a function to display a particular error message on an optical reader display.

3. The method of claim 1, to create a custom function wherein the step of identifying a string of the script routine modules comprises identifying a string of the script routine modules using the computer such that when the script routine modules are executed together in succession said string of script routine modules define a function to conduct an inventory application.

4. The method of claim 1, to create a custom function wherein the step of identifying a string of the script routine modules comprises identifying a string of the script routine modules using the computer such that when the script routine modules are executed together in succession said string of script routine modules define a function to conduct a shipping application.

5. The method of claim 1, to create a custom function wherein the step of transmitting the string of identifiers from the host computer to one or more optical readers comprises transmitting the string of identifiers from the host computer to one or more optical readers set to the host routines mode wherein the script routine modules identified by the string of identifiers are resident in the one or more optical readers.

6. The method of claim 1, to create a custom function wherein the step of executing the custom function comprises executing the custom function on at least one of the optical readers as the execution order of a selected list of script routine modules wherein a control circuit within the optical reader executes the script routine modules resident in a memory in the optical reader.

7. The method of claim 6, to create a custom function wherein the step of executing the custom function comprises executing the custom function on at least one of the optical readers as the execution order of a selected list of script routine modules wherein a control circuit within the optical reader executes script routine modules resident in a memory in the optical reader and the control circuit selects each successive script routine modules by use of a program pointer.

8. The method of claim 1, to create a custom function further comprising the step of sending a request to the host computer requesting the script identifiers before the step of transmitting the string of identifiers from the host computer.

9. A method to create a custom function in an optical reader comprising the steps of:

providing a hand held optical reader having a host command mode;

providing a host computer to communicate with the optical reader and to send one or more script routine modules to the optical reader set to the host command mode;

identifying one or more script routine modules to be transmitted to the optical reader;

transmitting the one or more script routine modules from the host computer to one or more optical readers set to the host command mode such that the script routine modules are executed together in succession by the optical reader as a custom function; and executing the custom function on at least one of the optical readers.

10. The method of claim 9, to create a custom function wherein the step of providing a hand held optical reader comprises providing a hand held optical reader having a host command mode and a control circuit.

11. The method of claim 10, to create a custom function further comprising the step of sending a request to the host computer to send a script routine module to the reader before the step of transmitting the one or more script routine modules.

12. The method of claim 9, to create a custom function wherein the step of providing a hand held optical reader comprises providing a hand held optical reader having a host command mode, a control circuit, and an interpreter.

13. The method of claim 12, to create a custom function wherein the step of executing the custom function comprises executing the custom function on at least one of the optical readers by interpreting the one or more script routine modules in the optical reader using the interpreter, and executing the interpreted script routine modules with the control circuit to perform the custom function.

14. The method of claim 13, to create a custom function wherein the step of executing the custom function comprises executing the custom function on at least one of the optical readers by interpreting the one or more script routine modules in the optical reader using the interpreter, and executing the interpreted script routine modules with the control circuit by further executing one or more firmware functions built into optical reader to perform the custom function.

15. The method of claim 9, to create a custom function wherein the step of identifying the one or more script routine modules comprises identifying the one or more script routine modules to be transmitted to the optical reader in the host command mode following an unsuccessful attempt to create the custom function using a host routines mode wherein one or more of the needed script routine modules is not resident in the optical reader.

16. The method of claim 15, to create a custom function wherein the step of identifying the one or more script routine modules comprises identifying the one or more script routine modules to be transmitted to the optical reader in the host command mode following an unsuccessful attempt to create the custom function using a host routines mode wherein one or more of the needed script routine modules is not resident in the optical reader, and after the needed script routine modules are loaded into the reader in the host command mode and after the reader is returned to the host routines mode, a pointer is established to associate each of the selected script routine modules with an identifier.

17. The method of claim 9, to create a custom function wherein the step of identifying the one or more script routine modules comprises identifying the one or more script routine modules to be transmitted to the optical reader to display a particular error message on an optical reader display.

18. The method of claim 9, to create a custom function wherein the step of identifying the one or more script routine modules comprises identifying the one or more script routine modules to be transmitted to define a function to conduct an inventory application.

19. The method of claim 9, to create a custom function wherein the step of identifying the one or more script routine modules comprises identifying the one or more script routine modules to be transmitted to the optical reader to define a function to conduct a shipping application.

20. A hand held optical reader including:
- a control circuit configured to control an image sensor and including a memory, a processor and firmware and where said processor is configured to execute instructions stored within said memory and said firmware;
- a main operating program including a plurality of said instructions configured for execution by said processor;
- a script interpreter program including a plurality of said instructions configured for execution by said processor, said script interpreter program is configured to interpret and execute commands communicated to said memory from another computer after execution of said main operating program; and where said commands direct the execution of firmware functions stored within said firmware.

\* \* \* \* \*